United States Patent [19]

Burgoyne, Jr. et al.

[11] Patent Number: 5,072,045
[45] Date of Patent: Dec. 10, 1991

[54] PROCESS FOR THE CATALYTIC ALKENYLATION OF ARYLAMINES WITH CONJUGATED DIENES

[75] Inventors: William F. Burgoyne, Jr., Emmaus, Pa.; Dale D. Dixon, Venice, Fla.

[73] Assignee: Air Product and Chemicals, Inc., Allentown, Pa.

[21] Appl. No.: 135,771

[22] Filed: Dec. 21, 1987

Related U.S. Application Data

[63] Continuation-in-part of Ser. No. 837,461, Mar. 7, 1986, Pat. No. 4,714,778.

[51] Int. Cl.$^5$ ............................................. C07C 211/46
[52] U.S. Cl. ..................... 564/307; 564/315; 564/322; 564/330; 564/334; 564/434; 564/435; 564/442; 564/443
[58] Field of Search ............... 564/307, 315, 330, 322, 564/434, 435, 442, 443, 334

[56] References Cited

U.S. PATENT DOCUMENTS

| | | | |
|---|---|---|---|
| 2,403,963 | 7/1946 | Axe | 260/671 |
| 2,471,922 | 5/1949 | Axe | 260/671 |
| 2,843,565 | 7/1958 | Christenson | 260/53 |
| 3,862,233 | 1/1975 | Dunn | 564/315 |
| 3,865,889 | 2/1975 | Mitchell | 260/668 B |
| 4,008,275 | 2/1977 | Sayigh et al. | 564/334 |

FOREIGN PATENT DOCUMENTS

| | | |
|---|---|---|
| 0082258 | 6/1983 | European Pat. Off. . |
| 1079628 | 4/1960 | Fed. Rep. of Germany ......... 12/25 |

Primary Examiner—C. Warren Ivy
Assistant Examiner—Ba K. Trinh
Attorney, Agent, or Firm—Russell L. Brewer; James C. Simmons; William F. Marsh

[57] ABSTRACT

The invention relates to an improved process for producing alkenylated aromatic amines which involves the catalytic reaction of an aromatic amine with a diene. The improvement resides in using a solvent in which the aromatic amine and diene are soluble in the proportions present in the reaction but inert to the reaction.

7 Claims, No Drawings

PROCESS FOR THE CATALYTIC ALKENYLATION OF ARYLAMINES WITH CONJUGATED DIENES

This is a continuation-in-part of U.S. Ser. No. 837,461 having a filing date of Mar. 7, 1986, now U.S. Pat. No. 4,714,778 and the subject matter is incorporated by reference.

TECHNICAL FIELD

This invention pertains to a process for producing alkenylated aryldiamines having particular suitability for antioxidant use and for post curable, cross-linkable polyurethane/urea elastomer systems.

BACKGROUND OF THE INVENTION

Alkylated diamines have been known for a substantial period of time and find use in the preparation of polyurethane elastomers. The diamines are typically used in that form as chain extenders for polyurethanes, i.e., forming a short chain urea linkage to strengthen the elastomer. As is known, the alkyl group alters the reactivity of the amine thus giving the composition unique processing properties for producing polyurethane elastomers.

Two types of synthesis techniques have been used to produce alkylated aromatic amines, such as, an alkylated toluenediamine. One of the earliest techniques used to prepare an alkylated aromatic diamine employed a Friedel-Crafts alkylation of an aromatic hydrocarbon, then dinitration of the alkylated aromatic hydrocarbon followed by reduction of the nitro groups to amine groups. The diamine could be converted to the diisocyanate by reaction with phosgene. Another technique for producing an alkylated aromatic amine involved nitration of an aromatic hydrocarbon, followed by reduction to the amine and then alkylation of the amine.

Aromatic compositions and particularly aromatic amines having unsaturated organo substituents are known. They have been prepared by alkenylation of aromatic compositions with diolefins. Some patents which show the manufacture of aromatic compositions having unsaturated organo substituents include:

U.S. Pat. No. 2,403,963 which discloses the reaction of benzene and butadiene in the presence of a boron trifluoride catalyst. Phenylbutenes are produced.

U.S. Pat. No. 2,471,922 discloses that aromatic hydrocarbons, which include phenols and aromatic halides, can be reacted with 1,3-diolefins to produce alkenyl derivatives. Examples of low-boiling 1,3-diolefins which can be used in the alkenylation include 1,3-butadiene, 1,3-pentadiene and so forth. Catalyst systems included boron trifluoride and boron trifluoride-phosphoric acid systems.

U.S. Pat. No. 3,865,889 discloses the preparation of an alkenylated aromatic hydrocarbon such as those obtained by reacting butadiene with an alkylbenzene, e.g., toluene or xylene. An alkali metal promoter is used to catalyze the reaction.

U.S. Pat. No. 2,843,565 discloses the production of butenyl-phenol-aldehyde resins which involves the reaction of an alkenylphenol, with formaldehyde. Conjugated dienes such as piperylene, cyclopentadiene, 1-chloro-2-methyl-butadiene are reacted with phenols in the presence of phosporic acid catalyst and the reaction product then reacted with formaldehyde.

West German 1,079,628 discloses the preparation of cyclopentenyl-substituted aromatic amines by reacting cyclopentadiene at secondary or tertiary aromatic amine substrates. Aniline, N-methylaniline, chloroaniline, and phenylenediamine are suggested aromatic amine candidates.

SUMMARY OF THE INVENTION

This invention pertains to an improved process for producing alkenylated aromatic diamines which involves reacting an aromatic diamine with a diene having conjugated double bonds in the presence of a solid phase, acidic catalyst. The reaction is carried out under conditions suited for alkenylation and the improvement resides in the use of a solvent in which both the aromatic diamine and diene are soluble but is inert to the reaction.

There are several advantages associated with the process of this invention, and these advantages include:

an ability to produce alkenylated aromatic amines having an unsaturated organo group for producing antioxidant activity;

an ability to produce alkenylated aromatic amines with excellent conversion of aromatic amine to alkenylated product;

an ability to minimize polymerization of the highly polymerizable diene; and an ability to produce alkenylated aromatic amines for providing desirable reactivity for preparation of various urethane and polyurea elastomer systems with an ability to cross-link the polyurethane through the unsaturated group.

DETAILED DESCRIPTION OF THE INVENTION

In the manufacture of alkenylated aromatic diamines, aliphatic diolefins which contain two conjugated double bonds typically polymerize in the presence of acid catalysts under alkenylated conditions, and as a consequence, the alkenylated derivative is not formed. This was particularly true where the catalyst systems were based upon aluminum-containing compositions, such as, aluminum anilide or aluminum chloride.

The aromatic amines which are suited for reaction with the diene to produce alkenylated aromatic amines represented by the formulas:

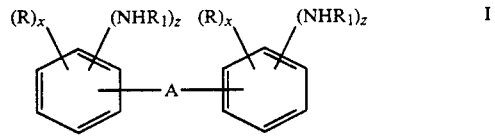   I

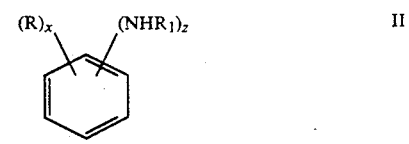   II wherein R is hydrogen, $C_{1-10}$ alkyl; $R_1$ is hydrogen or $C_{1-10}$ alkyl; x is 1 or 2, A is $C_{0-4}$ alkylene or NH, and z is 1 or 2 except one z in formula I can be zero.

As shown in the above formulas, the aromatic amine can be monoamino or diamino substituted on the aromatic ring. Further, the aromatic amine can be substituted with a variety of substituents which are nonreactive with the olefin in the alkylation reaction. Examples of nonreactive substituents include alkylamino where the alkyl portion has from 1-6 carbon atoms, such as N-ethyl, N-propyl and N-tert-butyl, alkyl where the alkyl substituent has from 1-6 carbon atoms, e.g. ethyl, propyl, tert-butyl cyclohexyl and, methylcyclohexyl; alkoxy where the carbon content is from 2-6 carbon atoms, and ester, where the carbon content is from 2-6 carbon atoms. Toluenediamine and aniline are the amines which readily lend themselves to alkenylation. The bridged biphenyl aromatic diamines can be synthesized by the condensation of the alkenylated mononuclear aromatic amine derivative.

Diolefins useful in this invention are acyclic and cyclic conjugated dienes. Examples of some dienes are 1,3-butadiene, isoprene, chloroprene, 2,3-dimethyl-1,3-butadiene, piperylene, 2-methyl-1,3-pentadiene, 2,4-hexadiene, 3,4-dimethyl-2,4-hexadiene, 2-phenyl-1,3-butadiene, 2-methoxy-1,3-butadiene, 2,5-dimethyl-2,4-hexadiene, cyclopentadiene, dicyclopentadiene, methylcyclopentadiene and 1,4-cyclooctadiene.

The compounds of this invention are synthesized by alkylating the aromatic amine with a conjugated diene having from 4 to about 12 preferably 4-8, carbon atoms. It is because the alkenylation is effected via the amino group that one is able to introduce at least one alkenyl group in a position ortho to an amine group and achieve unique results associated with the specific regiochemistry associated with those isomers. These unique properties include antioxidant characteristics and urethane processability characteristics. Aromatic amines having a position para to the amino group, such as aniline, may alkylate in the para position, but with appropriate selection of conditions, one can generally control the amount of ortho product produced. The alkenylated aromatic amines are represented by the formulas:

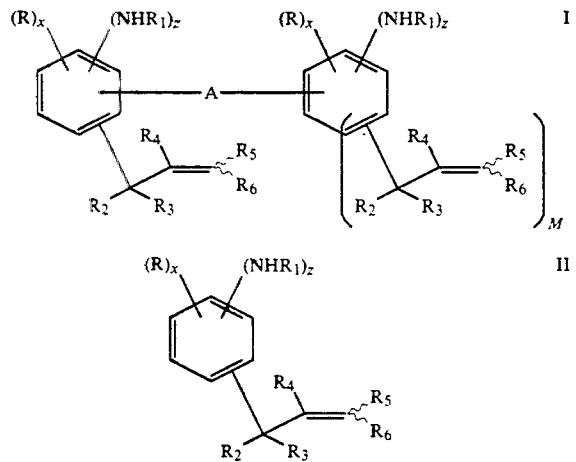

wherein R and $R_1$ are hydrogen or $C_{1-10}$ alkyl and $R_2$, $R_3$, $R_4$, $R_5$, and $R_6$ are hydrogen, $C_{1-3}$ aliphatic, or $R_2$ and $R_5$ or $R_6$ are bridged via an alkylene radical —$(CH_2)_y$— wherein y=2-5, A is $C_{0-4}$ alkylene or NH; x is 1 or 2 provided in said formula at least one of $R_2$, $R_3$, $R_4$, $R_5$, or $R_6$ is $C_1$ or greater, m is 0 or 1, and z is 1 or 2 except one Z in Formula I can be zero.

It is our belief the alkenylated aromatic amines are best prepared using highly acidic silica-alumina or crystalline molecular sieves as catalysts which are solid phase and have an acidity factor of at least 0.3 and preferably in excess of 0.8. The acidity factor is a measurement of acidity of the zeolite catalyst and involves contact of the catalyst with ammonia under adsorption conditions followed by desorption. More particularly, one gram of catalyst is contacted with ammonia at room temperature and then desorbed by heating to a temperature from ambient to 200° C. at a rate of 10° per minute, then holding at 200° C. for two hours. The amount of ammonia irreversibly adsorbed by one gram at 200° C. is indicative of acidity and indicative of the strength of the amine/acid bond. The acidity factor then is the amount of ammonia irreversibly adsorbed expressed in millimoles per gram of catalyst at 200° C. and as stated this level should be at least 0.3 and preferably 0.8 millimoles ammonia per gram of catalyst.

Zeolites which can be utilized for alkenylation of toluenediamines include X, Y, faujasite, ferrierite, offretite, chabazite, gmelinite, erionite, ferrierite, mordenite and the ZSM family. When initially prepared, the cation in the crystalline molecular sieve is an alkali metal, typically sodium. This ion must be exchanged in sufficient proportion, usually, 60% or greater, with an acidic ion such as a rare earth metal, e.g., lanthanum, praseodymium; hydrogen or some of the transition metals such as nickel, copper, chromium and the like. The substitution of various ions for the sodium ion alters the acidity of crystalline molecular sieve, thus making it more reactive and catalytically effective for ring alkenylation of the aromatic amine.

The naturally occurring and synthetic zeolites used in the process normally have a silica to alumina molar ratio from about 2 to 25:1. However, if the silica to alumina ratio is low or acidity borders on the low side of that desired, the silica to alumina ratio and acidity of the zeolite may be altered by a technique called dealumination. In effect, the practice of dealumination decreases the alumina content in the zeolite thereby increasing the silica to alumina ratio. The removal of alumina from the internal structure affects acidity and may also enlarge the cage structure or pore size of the zeolite to permit entry of and diffusion of larger molecules into its internal structure. Thus, one may be able to utilize a particular cation in a dealuminated zeolite, but not use the same cation in its non-dealuminated state. This is because the original cation may not have provided sufficient acidity for effecting ring alkenylation of toluenediamine. Some of the techniques for dealumination include chelation, dehydration or acidification, the latter entailing the treatment of the zeolite with an inorganic acid. Techniques suited for dealumination of zeolites are well known.

Zeolites and crystalline molecular sieves are porous materials with the pores having generally uniform molecular dimensions. Cavities or cages are formed in this zeolite or molecular sieve and connected by channels of generally defined diameter. For the practice of this invention the pore diameter should be sufficiently large to permit the molecules to effectively enter the interior of the molecular sieve for reaction and to exit as final product. Typically, the pore size will range from about 6 to 15 Angstroms, but the size of a pore required for reaction can vary depending upon the product being produced. If conversion levels appear low for the particular catalyst, that level may be due to reactant diffusion resistance through the molecular sieve. If that is the case, a molecular sieve of slightly larger pore size should be tried.

Ring alkenylation is effected by reacting the aromatic amine with the diolefin at temperatures ranging from about 75° to 225° C. and preferably from about 150° to 225° C. The pressures will range from about 15 to 2000 psig and generally in the range of 50 to 1500 psig. It is common practice to alter the temperature and the pressure within the above ranges specified to optimize selectivity and conversion to the desired product. Mole ratios of olefin to aromatic amine used in the reaction will range from about 1:5 to 10:1 and the reaction time will generally be from about 2 to 48 hours when synthesized in an autoclave or within 0.05 to 6 hr −1, expressed as a liquid hourly space velocity (LHSV) for fixed bed continuous operation.

In the ring alkenylation of aromatic amines utilizing the solid, highly acidic catalyst systems excellent conversion and selectivity can be achieved. However, the diolefins having conjugated unsaturation, tend to polymerize and generate substantial amounts of by-product polymer. In many cases the combination of reactant and catalyst preclude the formation of alkenylated aromatic amines and substantially all of the olefin is converted to by-product polymer. Butadiene, isoprene and cyclopentadiene are substantial offenders and in the presence of highly acidic catalysts tend to polymerize readily under the reaction conditions providing low yields of ring alkenylated product. Less acidic catalysts, e.g., montmorillonite and bleaching earths are not as effective in ring alkenylation but reduce polymerization. To avoid polymer production it is necessary to carry out the ring alkenylation of the aromatic diamine in the presence of a solvent in which the reactants and products are soluble in the proportion present in the reaction and which is inert to reaction and does not promote polymerization. Solvents which can be best utilized generally have a dielectric constant in the range of 1.5 to 3.0 and include paraffins such as pentane, hexane, heptane, octane, decane; toluene and xylene, paraffinic naptha fractions, kerosene; and cycloparaffin hydrocarbons having from about 5 to 10 carbon atoms, e.g., cyclohexane and so forth. Ethers are also acceptable, and examples are glyme, tetraglyme, tetrahydrofuran, and dioxane. Halogenated solvents such as carbon tetrachloride and aliphatic ketones can be used.

The alkenylated aromatic amines described herein have also been found to be excellent antioxidants for oils and rubber. The high antioxidant activity coupled with synthesis based on relatively inexpensive raw materials provides for products having a desirable cost/performance ratio. The alkenylated products have been evaluated for use in hydraulic oil and natural rubber, but it is believed the antioxidant properties will be generally useful for adhesives, sealants, coatings, elastomers, plastics, and petroleum products such as hydrocarbon fuels.

The following examples are provided to illustrate preferred embodiments of the invention and are not intended to restrict the scope thereof. All parts are part by weight and all percentages are expressed as weight percent unless otherwise specified.

EXAMPLE 1

Preparation of 5-(cyclopent-2-enyl)-2,4-toluenediamine Using Pentane as Solvent

A 200 g (1.64 mol) portion of 2,4-toluenediamine, 162 g (1.23 mol, 2.45 equiv) of dicyclopentadiene, 200 g (2.78 mol) of pentane, and 20.0 g of an amorphous alumina-silica catalyst comprised of 13% alumina and 87% silica were charged to a 1000 cc pressure vessel equipped with a mechanical stirrer. The vessel was sealed and purged with nitrogen leaving a 32 psig nitrogen blanket. The vessel contents were heated to 205° C. with stirring and were maintained at that temperature for 22 hr. The contents were cooled to 150° C. and isolated catalyst free by hot filtration. Selective removal of residual hydrocarbons by vacuum distillation and analysis by gas chromatography (GC) revealed the following product mixture:

|  | GC Area % |
|---|---|
| 2,4-toluenediamine | 36.02 |
| 3-(cyclopent-2-enyl)-2,4-toluenediamine | 2.51 |
| 5-(cyclopent-2-enyl)-2,4-toluenediamine | 57.34 |
| Other Aromatic Diamine derivatives including 3,5-di(cyclopent-2-enyl) 2,4-toluenediamine | 4.13 |
| Total | 100.0% |
| Conversion of 2,4-toluenediamine = | 64% |

This example shows that both positions ortho to each amine were reactive to alkenylation, but as one might expect, the 5 position was more reactive than the 3-position. The dicyclopentadiene is cracked in situ, forming cyclopentadiene under the reaction conditions. Analysis of the hydrocarbons in the product mixture prior to distillation shows only cyclopentadiene and pentane present. No significant amounts of cyclopentadiene oligomers were formed. In the absence of the pentane solvent, substantial oligomer formation occurs.

EXAMPLE 2

Preparation of 3-(cyclopent-2-enyl)-2,6-toluenediamine Using Pentane Solvent

A 200 g (1.64 mol) portion of 2,6-toluenediamine, 162 g (1.23 mol, 2.45 equiv) of dicyclopentadiene, 200 g (2.78 mol) of pentane, and 20.0 g of a catalyst comprised of 13% alumina and 87% silica were charged to a stirred vessel and reacted at 205° C. in a similar fashion as indicated in Example 1. Isolation of a catalyst free sample by hot filtration followed by selective removal of all residual hydrocarbon by distillation afforded the following product mixture:

|  | GC Area % |
|---|---|
| 2,6-toluenediamine | 51.32 |
| 3-(cyclopent-2-enyl)-2,6-toluenediamine | 43.67 |
| Other Aromatic Diamine including 3,5-di(cyclopent-2-enyl)-2,6-toluene-diamine Derivatives | 5.02 |
| Total | 100.0% |
| Conversion of 2,6-toluenediamine | 49% |

Examples 1 and 2 show that both the 2,4- and 2,6-isomer of toluenediamine were reactive to alkenylation using an acidic silica-alumina catalyst in the presence of a solvent system and that the use of pentane as a solvent minimized polymerization of the cyclopentadiene.

EXAMPLE 3

Preparation of 3-(3-methylbut-2-enyl)-2,6-toluenediamine Using Pentane Solvent

A 200 g (1.64 mol) portion of 2,6-toluenediamine, 167 g (2.45 mol) of isoprene, 200 g (2.78 mol) of pentane, and 20 g of powdered H-Y zeolite were reacted at 150° C. in a similar fashion as indicated in Example 1. Isolation of a catalyst free sample was obtained by hot filtration. Selective removal of all residual hydrocarbon by vacuum distillation afforded the following product mixture:

|  | GC Area % |
|---|---|
| 2,6-toluenediamine | 50.30 |
| 3-(3-methylbut-2-enyl)-2,6-toluenediamine | 41.49 |
| Other Aromatic Diamine including 3,5-di(3-methylbut-2-enyl)-2,6-toluenediamine derivatives | 8.21 |
| Total | 100.0% |
| Conversion of 2,6-toluenediamine | 50% |

EXAMPLE 4

Preparation of 3-(3-methylbut-2-enyl) and 5-(3-methylbut-2-enyl)-2,4-toluenediamines Using Pentane Solvent A 200 g (1.64 mol) portion of 2,4-toluenediamine, 167 g (2.45 mol) of isoprene, 200 g (2.78 mol) pentane, and 20 g of a catalyst comprised of 13% alumina and 87% silica were reacted at 200° C. in a similar fashion as indicated in Example 1. Isolation of catalyst free sample was accomplished by hot filtration. Selective removal of all residual low boiling hydrocarbons by vacuum distillation afforded the following product mixture:

|  | GC Area % |
|---|---|
| 2,4-toluenediamine | 60.38 |
| 3-(3-methylbut-2-enyl)-2,4-toluenediamine | 12.23 |
| 5-(3-methylbut-2-enyl)-2,4-toluenediamine | 16.01 |
| Other Aromatic Diamine derivatives including 3,5-di(3-methylbut-2-enyl)-2,4-toluenediamine derivatives | 11.38 |
| Total | 100.0% |
| Conversion of 2,4-toluenediamine | 40% |

As can be seen from this example and Example 3, the presence of a solvent minimized polymerization of isoprene.

EXAMPLE 5

Preparation of 5-(cyclopent-2-enyl)-2,4-toluenediamine over a 13% Alumina/87% Silica Catalyst without Solvent A 300 g (2.45 mol) portion of 2,4-toluenediamine, 243 g (1.84 mol, 3.68 equiv.) of dicyclopentandiene, and 30 g of a 13% alumina/87% silica catalyst were reacted in a manner similar to Example 1. The reaction was carried out without solvent at a temperature of 225° C. for 17 hr. The product was isolated as a solid, polymeric mass. Most of the oligomerized cyclopentadiene present in the reaction mixture, could be decomposed and removed by heating the sample to 160° C. under vacuum. The toluenediamine derivatives were then isolated from the residual polymer and tars by vacuum distillation over a temperature range of 120°-180° C. at 0.1 mm Hg pressure. Analysis of the aromatic diamine products is provided below:

|  | GC Area % |
|---|---|
| 2,4-toluenediamine | 53.39 |
| 3-(cyclopent-2-enyl)-2,4-toluenediamine | 3.16 |
| 5-(cyclopent-2-enyl)-2,4-toluenediamine | 37.69 |
| Other Aromatic Diamine derivatives | 5.76 |
| Total | 100.0% |
| Conversion of 2,4-toluenediamine | 47% |

The isolated yield of alkenylated product in this experiment was much less than the yield realized in Example 1. It is believed that because a solvent was not used in this experiment much of the cyclopentadiene was converted to polymeric material and therefore not available for reaction.

EXAMPLE 6

Alkenylation of 2,4-toluenediamine with Isoprene Over 13% Alumina/87% Silica Catalyst Without Solvent A 90.0 g (0.735 mol) portion of 2,4-toluenediamine, 75.0 g (1.10 mol) of isoprene, and 9.0 g of the 13% alumina/87% silica catalyst were charged to a 300 cc pressure vessel equipped with a mechanical stirrer. The reaction was carried out without solvent at a temperature of 200° C. for 25 hr. The product was isolated and the catalyst was removed by filtration. The catalyst-free product was dissolved into a minimal amount of methanol then extracted with toluene. The toluene extract resulted in 43.9 g of isoprene derived polymer, accounting for 59% of the isoprene charged to the reaction mixture. Analysis of the methanol phase revealed the following aromatic amine product distribution:

|  | wt % |
|---|---|
| 2,4-toluenediamine | 80.78 |
| 3,(3-methylbut-2-enyl)-2,4-toluenediamine | 8.28 |
| 5-(3-methylbut-2-enyl)-2,4-toluenediamine | 10.94 |
| Total | 100.00% |
| Conversion of 2,4-toluenediamine | 19% |

The beneficial results of solvent addition are demonstrated by comparison of this example to Example 4. The amount of isoprene derived polymer was substantially reduced by addition of solvent as in Example 4 and conversion was increased.

EXAMPLE 7

4-(But-2-enyl)Aniline Using Pentane Solvent

A tubular reactor, consisting of a 0.5" ID 304 stainless steel tube and jacketed with a single element heater was packed with 24 cc (14.64 g) of 12/18 mesh 13% Al$_2$O$_3$/87% SiO$_2$. The reactor pressure was brought up to 900 psi with accelerated aniline flow. The aniline flow was then reduced to 3.0 cc/hr) and the reactor temperature was increased to 175° C. Then pentane (19.0 cc/hr) and 1,3-butadiene (2.7 cc/hr) were introduced to the down-flow reactor. (A portion of the butadiene feed is converted to a dimeric product, 4-vinyl-1-cyclohexane. Vinylcyclohexane is inert under these reaction conditions and may serve as solvent.) The relative molar ratio of aniline/1,3-butadiene/pentane was 1:1:5.

After an equilibration time of 16 hours, a sample was collected from the reactor and submitted to gas chromatographic analysis. The conversion of aniline was 34.4%. The nitrogen-containing product stream was analyzed and selectivity calculations were based upon nitrogen-containing materials.

| Product | Mol % |
| --- | --- |
| 2-(1-methylprop-2-enyl)aniline | 9.42 |
| 4-(but-2-enyl)aniline | 67.34 |
| 2-(1-methylprop-2-enyl)-4-(but-2-enyl)aniline | 16.16 |
| Unidentifiables | 7.08 |

The reaction was continued for a period of 25 days. The collected product sample was then analyzed. Aniline conversion averaged 21% and the organonitrogen product stream analyzed as follows:

| | Mol % |
| --- | --- |
| 4-(1-methylprop-2-enyl)aniline | 10.63 |
| 4-(but-2-enyl)aniline | 69.91 |
| 2-(1-methylprop-2-enyl)-4-(but-2-enyl)aniline | 16.16 |
| Unidentifiables | 6.53 |

The above results show good yield and selectivity without significant loss of catalyst activity as a result of polymer production.

EXAMPLE 8

4-(Butyl-2-enyl)aniline with and without Solvent

Aniline and butadiene were reacted in a 1:1 molar ratio as in Example 7, but the molar ratio of pentane organic solvent, relative to aniline, was varied from 7.6 to 0.0. The reaction temperature was 200° C. and the reactor pressure was 950 psi. As can be seen from the table below, aniline conversion was proportional to the amount of pentane solvent used. Runs 7 and 8 used no solvent and aniline conversion dropped to less than 8%. When pentane was reintroduced to the system, as in Runs 9 and 10, the aniline conversion increased to about 35-40%. It is believed that the absence of pentane allows polymeric deposits to form at the catalyst surface, and if pentane is added quickly enough, the deposits are largely removed by the solvent and activity is increased.

| | Actual Feed Rate cc/hr | | | Product Stream - Mole % | | |
| --- | --- | --- | --- | --- | --- | --- |
| Run | N/R/S | Aniline | Butadiene | Pentane | Aniline | Butenyl Anilines | Other GC Elutable |
| 1 | 1/1/4 | 1.37 | 1.50 | 7.60 | 56.47 | 28.47 | 15.05 |
| 2 | 1/1/4 | 1.37 | 1.50 | 7.60 | 51.81 | 30.55 | 17.64 |
| 3 | 1/1/2 | 1.37 | 1.50 | 3.80 | 57.94 | 27.13 | 14.93 |
| 4 | 1/1/2 | 1.37 | 1.50 | 3.80 | 58.52 | 27.09 | 14.38 |
| 5 | 1/1/1 | 1.37 | 1.50 | 1.9 | 71.19 | 18.71 | 10.10 |
| 6 | 1/1/1 | 1.37 | 1.50 | 1.9 | 71.73 | 17.97 | 10.30 |
| 7 | 1/1/0 | 1.37 | 1.50 | 0.0 | 94.92 | 3.07 | 2.01 |
| 8 | 1/1/0 | 1.37 | 1.50 | 0.0 | 92.19 | 4.49 | 3.32 |
| 9 | 1/1/4 | 1.37 | 1.50 | 7.6 | 58.78 | 32.35 | 8.87 |
| 10 | 1/1/4 | 1.37 | 1.50 | 7.6 | 63.78 | 26.67 | 9.55 |

(a) N/R/S = molar feed ratio of aniline to butadiene to pentane
(b) over a 24 cc catalyst bed of 13% Al$_2$O$_3$/87% SiO$_2$

EXAMPLE 9

Butenyl Aniline Using Toluene as a Solvent

Aniline and butadiene were reacted in a 1:1 molar ratio as in Example 7, but with toluene as the solvent and in a molar ratio of 8:1 relative to aniline. The reaction pressure was maintained at about 930 psi and the temperature was varied from 125° C. to 224° C. As can be seen from the table below, toluene is a useful solvent in that the reaction afforded only g.c. non-elutable materials (i.e. polymer) at the highest temperature studied; 224° C. Useful conversions were observed in the 150°–180° C. range. Selectivity for butenylated arylamines was particularly useful up to about 200° C. As in the case of pentane, the product stream contained the dimer of butadiene, 4-vinyl-1-cyclohexane.

| | | Toluene Solvent | | |
| --- | --- | --- | --- | --- |
| Run | Temp. | Aniline Conversion | Butenyl Anilines | Other G.C. Elutable | G.C. Non-Elutable |
| 1 | 125° C. | 5.55 | 73 | 27 | 0 |
| 2 | 125° C. | 5.14 | 78 | 22 | 0 |
| 3 | 150° C. | 18.76 | 83.5 | 16.5 | 0 |
| 4 | 150° C. | 18.76 | 83.6 | 16.4 | 0 |
| 5 | 175° C. | 44.63 | 79.3 | 20.7 | 0 |
| 6 | 175° C. | 34.71 | 78.7 | 21.3 | 0 |
| 7 | 200° C. | 40.47 | 65.9 | 34.1 | 0 |
| 8 | 200° C. | 37.26 | 67.9 | 32.1 | 0 |
| 9 | 225° C. | 33.68 | 36.5 | 34.4 | 29.1 |

EXAMPLE 10

Butenyl Aniline Without Solvent

Aniline and butadiene were reacted in 1:1 molar ratio as in Example 7, but no solvent was used. The reaction temperature was 175° C. and the pressure was 800 psi. By the third day of operation significant quantities of polymer precipitated from the collected samples and on the sixth day of operation, the reactor bed blocked and the reaction had to be terminated. The polymeric material is identified in the table below as G.C. non-elutable material. While not apparent from the data, the absence of a solvent greatly increased the amount of 4-vinylcyclohexene produced as a by-product. This example may be compared to Example 7 and it can be seen that even when this reaction was running, the aniline conversion and selectivity to butenylanilines was inferior to those runs where an inert solvent was used.

| | | Product Stream | | |
| --- | --- | --- | --- | --- |
| Sample | Days of Operation | Aniline | Butenyl Anilines | Other G.C. Elutables | G.C. Non-Elutables |
| 1 | 2 | 79.16 | 12.27 | 3.32 | 5.25 |
| 2 | 6 | 70.59 | 18.25 | 3.02 | 8.14 |

What is claimed is:

1. In a process for producing an alkenylated aromatic amine having at least one alkenyl substituent by the reaction of an aromatic amine with a diene having conjugated unsaturation in the presence of a solid phase catalyst, selected from the group consisting of silica-alumina and a highly acidic crystalline alumino-silicate having an acidity factor of at least 0.3 moles ammonia absorbed/gm catalyst, the improvement for reducing polymerization of a diene selected from the group consisting of cyclopentadiene, butadiene and isoprene in the alkenylation of aromatic amine and enhancing conversion which comprises utilizing an aromatic amine represented by the formula:

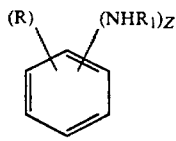

wherein R is hydrogen or $C_1$ methyl and $R_1$ is hydrogen, and Z is 1 or 2 and;

carrying out the reaction in the presence of an aromatic or aliphatic hydrocarbon solvent having a dielectric constant of from 1.5 to 3, dioxane or tetrahydrofuran.

2. In a process for producing an alkenylated aromatic amine having at least one alkenyl substituent by the reaction of an aromatic amine with a diene having conjugated unsaturation in the presence of a solid phase catalyst, the improvement which comprises:

utilizing an aromatic amine selected from the group consisting of aniline, toluidine and toluenediamine;

utilizing a diene selected from the group consisting of isoprene, cyclopentadiene, and butadiene;

utilizing a solid phase catalyst selected from the group consisting of silica-alumina and a highly acidic crystalline alumino-silicate having an acidity factor of at least 0.3 mmoles ammonia absorbed 1 pm catalyst; and carrying out the reaction in the presence of an inert solvent in which the aromatic amine and diene are soluble in the proportions present in the reaction and, further, such solvent being inert to the reaction.

3. The process of claim 1 wherein the reaction temperature is from 75° to 225° C., and the pressure is from 50 to 1500 psig.

4. The process of claim 3 wherein the solvent is selected from the group consisting of aromatic hydrocarbons, dioxane, and tetrahydrofuran.

5. The process of claim 1 wherein said solvent is toluene or a $C_{5-10}$ aliphatic hydrocarbon.

6. The process of claim 5 wherein in said aromatic amine R is hydrogen.

7. The process of claim 6 wherein said catalyst is silica-alumina.

* * * * *